United States Patent [19]

Bracesco

[11] 4,268,557
[45] May 19, 1981

[54] PROCESS AND MOLD FOR PRODUCING PADDED SEAT BACKS, AND THE PRODUCT OBTAINED

[76] Inventor: Roberto Bracesco, Corso Siracusa 123/2, Turin, Italy

[21] Appl. No.: 55,465

[22] Filed: Jul. 5, 1979

[51] Int. Cl.³ .................. B32B 5/20; B29D 27/00; A47C 7/40
[52] U.S. Cl. .................. 428/71; 156/79; 249/162; 264/46.6; 264/46.7; 264/DIG. 83; 425/415; 425/817 R; 428/315
[58] Field of Search .......... 264/46.6, 46.4, 46.5, 264/46.7, DIG. 83, 278; 425/415, 817 R; 249/162, 160, 161; 156/79; 297/452, 460, DIG. 2; 428/71, 315

[56] References Cited

U.S. PATENT DOCUMENTS

| | | | |
|---|---|---|---|
| 2,944,170 | 7/1960 | Knapp et al. | 264/46.5 X |
| 3,153,833 | 10/1964 | Jackson | 425/415 X |
| 3,238,287 | 3/1966 | Chapman | 264/278 X |
| 3,246,068 | 4/1966 | Ferreira | 264/278 X |
| 3,485,347 | 12/1969 | McGill et al. | 264/46.6 X |
| 3,641,725 | 2/1972 | Grisell | 264/46.6 X |
| 3,830,609 | 8/1974 | Heier | 425/415 X |
| 4,115,170 | 9/1978 | Sanson | 264/46.6 X |
| 4,153,657 | 5/1979 | Wilcox | 264/46.6 |

*Primary Examiner*—Philip Anderson
*Attorney, Agent, or Firm*—Miller & Prestia

[57] ABSTRACT

A process and mold for producing padded motor vehicle seat backs containing a metal framework surrounded by polyurethane foam in a plastic coating. The framework is inserted through a slit in the coating which is then sealed. Then the polyurethane foam is injected through a flexible filler neck into the coating and allowed to polymerize. After polymerization the filler neck is cut off. The framework may be contained in a plastic bag together with a relatively resilient foamed plastic body. The coating may be pressurized inwardly and pressure in the mold may be reduced during injection of the polyurethane foam. The mold comprises a pair of lateral mold parts and a central mold part together defining the mold cavity. The lateral mold parts are movable toward and away from the central mold part by hydraulic or pneumatic rams.

15 Claims, 11 Drawing Figures

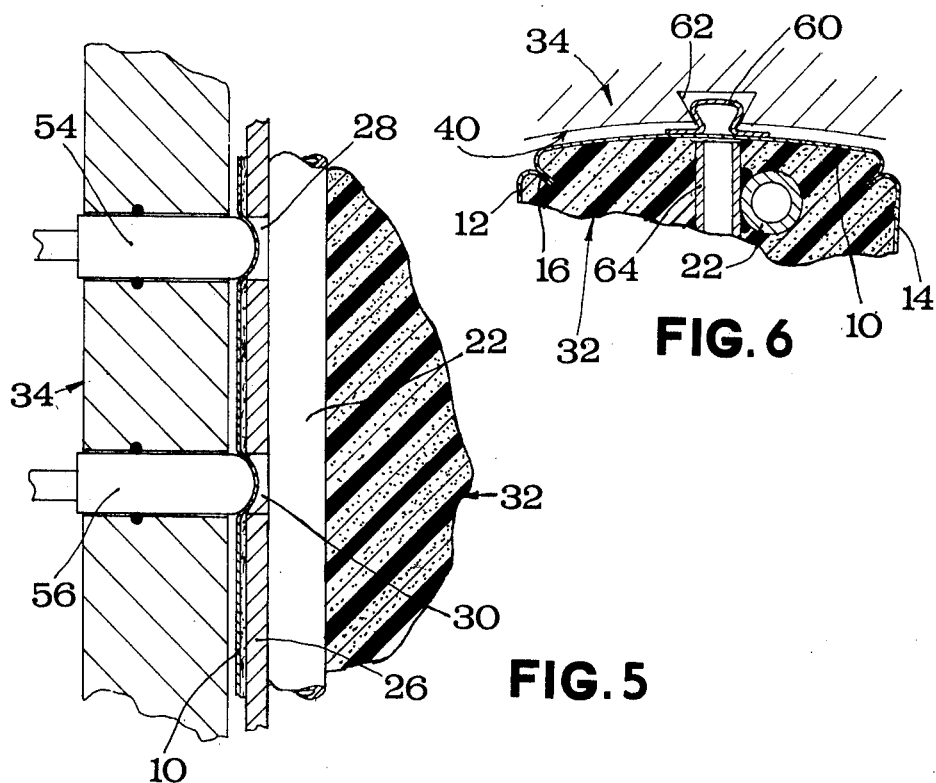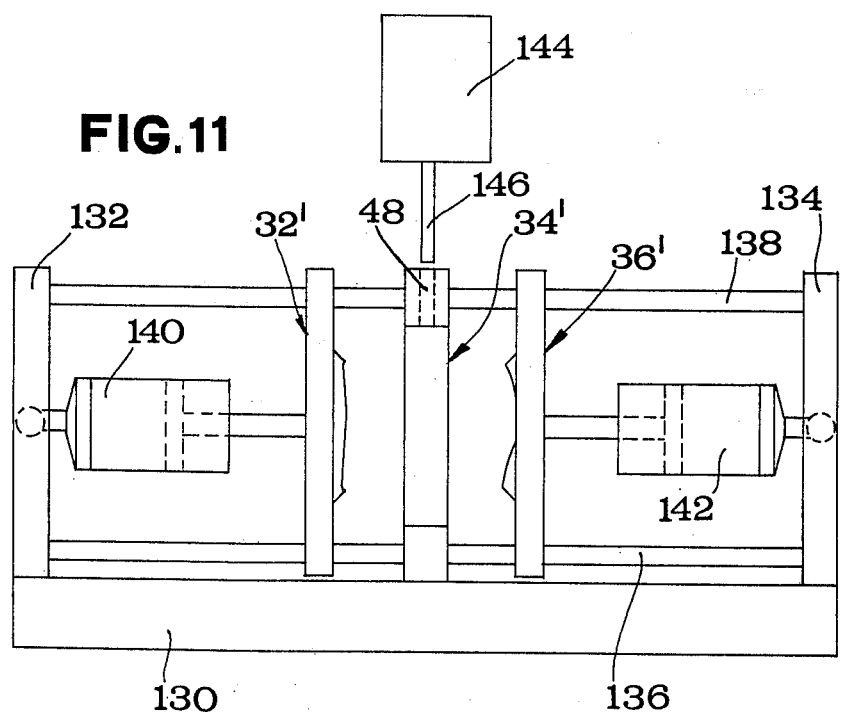

PROCESS AND MOLD FOR PRODUCING PADDED SEAT BACKS, AND THE PRODUCT OBTAINED

This invention relates to a process and mold for producing padded seat parts, particularly motor vehicle seat backs, and the product obtained.

Motor vehicle seat cushions and padded seat backs hitherto have been made by sewing or heat sealing or high-frequency sealing together several sheets of prefabricated flexible material to form a coating, squeezing into the coating a cushion of foamed plastics and a supporting framework, produced separately, and then sewing up or otherwise closing the opening or slit through which the cushion and framework had been introduced into the coating. Sometimes the coating was previously molded under the action of heat to impart to its component sheets and thus the finished cushion or seat back the desired shape.

Together with the cushion generally also certain accessory parts such as metal frameworks, reinforcing plates and members for connection of the cushion or seat back to the seat base frame were introduced into the coating. In some cases such frameworks or accessory parts were also made of rigid plastic material.

More recently attempts have been made to fill a cushion coating with polyurethane foam while the latter was still in a fluid state. In this case the coating was made of two sheets which were heat sealed or electrically sealed together along a junction line in which a lining strip was included that projected to the outside of the coating and was provided with positioning lugs for positioning the coating in a mold. One of the surfaces of the coating was provided with an opening or filler neck through which polyurethane foam in the fluid state was then introduced under slight pressure into the coating while a vacuum or low pressure was produced around it in the mold. Also in this case the coating was sometimes previously shaped under the action of heat. After polymerization the filler neck was cut off and the cushion was ready for use.

Although this method of producing a cushion constitutes a considerable advance over the previously used manual methods, as it permits a substantial mechanization of the process of making a cushion, it still has some disadvantages. First of all, the finished cushion produced by this method has only one surface suitable for exhibition because the other surface of the coating contains the remainders of the filler neck which make it unsightly. Then it is not possible to incorporate a framework in the cushion, particularly a framework provided with connection lugs for securing the cushion in the operative position on the seat supporting frame. In fact, with the known method it is only possible to produce a separate compartment within the coating by connecting to the junction line of the outer coating sheets one or more additional flexible sheets and providing one or more additional openings or filler necks for filling this compartment with foamed or unfoamed plastic material that is more rigid than the padding for the purpose of stiffening the cushion. However, by proceeding in this manner not only the general aspect of the outer cushion surface having the filler openings is further deteriorated but also the problem of insertion of the framework is not solved as the stiffening element thus formed can neither be provided with connection lugs nor accurately dimensioned since its shape is determined by the manner in which the material introduced into said compartment sets and thus may vary.

For the production of seat backs having an incorporated framework with the known injection molding process, the coating was formed with sealed bag communicating with the atmosphere and the framework was inserted into the bag before injection of the polyurethane foam. With this method there was the risk of piercing the bag by metal portions of the framework during injection of the polyurethane foam under external low pressure or vacuum with the result that the foam came out and the produced seat back had to be discarded. Also it was difficult to close the bag around the projecting portions of the framework and to cause expansion of the foam into the coating due to the obstacle formed by the bag.

It is an object of the present invention to provide a process and mold for the production of cushions and padded seat parts, particularly motor vehicle seat backs, which permit to simplify the production procedure and reduce the cost of production of seat backs or cushions containing an accurately dimensioned framework and/or adapted to be mounted, when finished, with all their surfaces, particularly the main surfaces, exhibited.

A particular object of the invention is to provide a process and mold for the production of padded seat parts, particularly seat backs, having two main surfaces connected, if desired, to a peripheral strip extending along their opposed edges, in which there is no need, or only a reduced need, for the provision of means for positioning the coating in the mold, thus avoiding the problem or difficulty of securing such means to the coating and the high cost of positioning such means on the mold.

Another object of the present invention is to provide a process which permits the framework to be easily recovered from the padded part or seat back when the latter has to be discarded during or after the production process because of constructional defects.

These and other objects and advantages, which will become apparent in the course of the following description, are achieved according to the invention by providing a process for the production of padded seat parts having an incorporated framework, particularly motor vehicle seat backs, which comprises the steps of forming a coating of fluidtight material having a slit extending over a length at least as great as the smallest width of the framework and a hole provided with a filler neck, inserting the framework through said slit into the coating, sealing the slit, placing the coating into a mold having the desired shape of the padded part to be produced, closing the mold, injecting polyurethane foam through the filler neck into the coating until the latter is completely filled, permitting the polyurethane foam to polymerize, and extracting the padded part from the mold.

According to another feature of the present invention, the coating inserted into the mold is slightly pressurized inwardly before the mold is closed to cause the coating to be properly located within the mold.

According to another feature of the invention, the framework may be sealed under vacuum in a bag of flexible plastic material before it is inserted into the coating so that the framework can be easily recovered by tearing up the coating and releasing the framework from the padding when the produced seat part has to be discarded.

According to a further feature of the invention, the framework placed into the coating is provided with positioning recesses located adjacent the coating and arranged to cooperate through the coating with convex-headed pistons projecting from the inner walls of the mold for positioning the coating and framework relative to the mold before injection of the polyurethane foam.

According to yet another feature of the invention, the framework may have at least two rigid surfaces provided with positioning holes adjacent the coating and after extraction of the finished padded part from the mold, the coating may be pierced adjacent the positioning holes to permit the padded part to be mounted on the seat.

The framework may be provided with cylindrical sleeves for receiving headrest supporting rods and in this case, before placing the coating into the mold, the coating is pierced adjacent the mouths of the cylindrical sleeves by cylindrical punches having a conical point and a cylindrical shank portion fitting exactly into the sleeves, each punch being provided with a rearwardly extending pin projecting from the coating and engaging a corresponding recess in the mold.

Some preferred embodiments of the invention will now be described by way of example and with reference to the accompanying drawings, in which:

FIG. 5 is a part sectional view of a detail of the mold on a larger scale together with a portion of a seat back being produced;

FIG. 6 is a part sectional view of another detail of the mold on a larger scale together with a portion of a seat back being produced;

FIG. 11 is a schematic side elevational view showing a preferred embodiment of an injection mold used in carrying out the process according to the invention.

Figure 1:
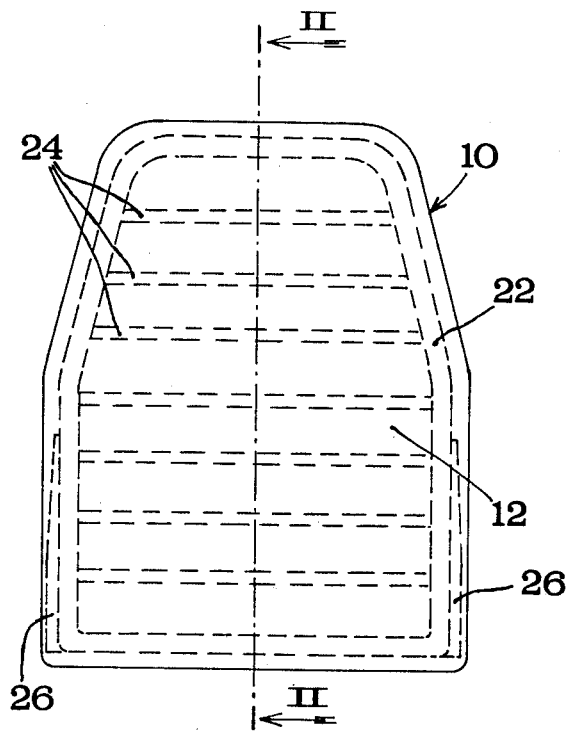
FIG. 1 is a front view of a motor vehicle seat back produced by the process according to the invention.
Figure 2:
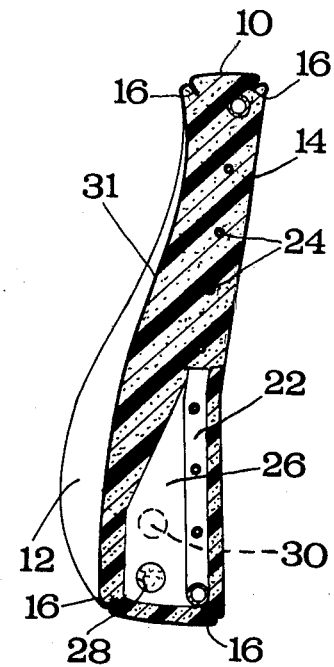
FIG. 2 is a transverse section through the seat back of FIG. 1 with a portion broken away and the section taken along the line II—II in FIG. 1.
Figure 3:
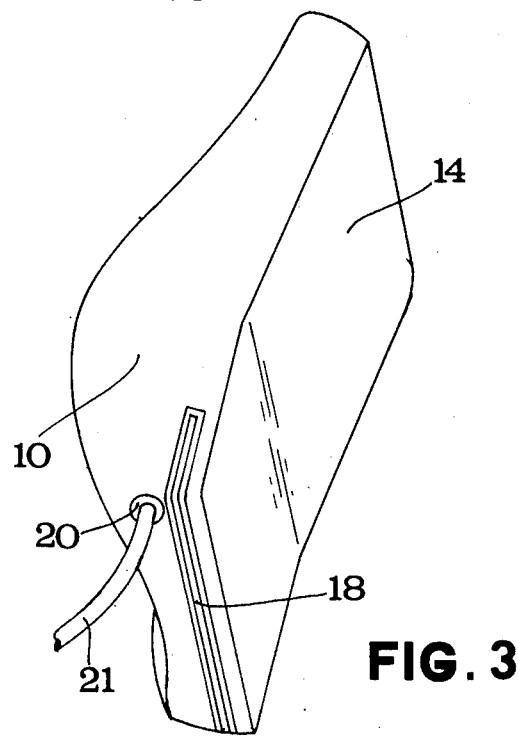
FIG. 3 is a perspective view from below of the seat back of FIGS. 1 and 2.

Referring now to FIGS. 1, 2 and 3, which show various views of a seat back made by the process according to the invention, this seat back comprises a peripheral strip 10 of flexible material such as PVC, imitating leather or waterproof fabric, and a front sheet 12 and rear sheet 14 of the same or similar material, sealed to the opposite edges of the peripheral strip 10 along junction lines 16. The sheets 12 and 14 and the peripheral strip 10 may be connected in the conventional manner by high-frequency sealing in the inverted form and then turned inside out to form the seat back coating.

In its lower portion which in use is placed adjacent to the lower cushion of the seat and is secured to the seat back supports, the peripheral strip 10 is provided with a slit which in the peripheral direction extends at least over a length corresponding to that of the bottom side of the seat back and is closed by a hermetic seal 18. A preferred type of such seal is the one brought on the market under the trade name "Flexico N" by Renco Marwell, Milan, Italy. On the same side the strip 10 has a filler hole 20 provided with a filler neck or sleeve 21 which is cut off before mounting the seat back in place.

Inserted into the coating 10, 12, 14 is a conventional metal framework 22 formed by a tubular frame with transverse rods 24 and plates 26 provided with mounting holes 28 and, if desired, recesses 30. In the illustrated embodiment the framework is made of metal, but it may also be made completely or partially of rigid synthetic resin inserts. The inner space of the coating is then filled with polyurethane foam 31 which forms the padding.

Figure 4:
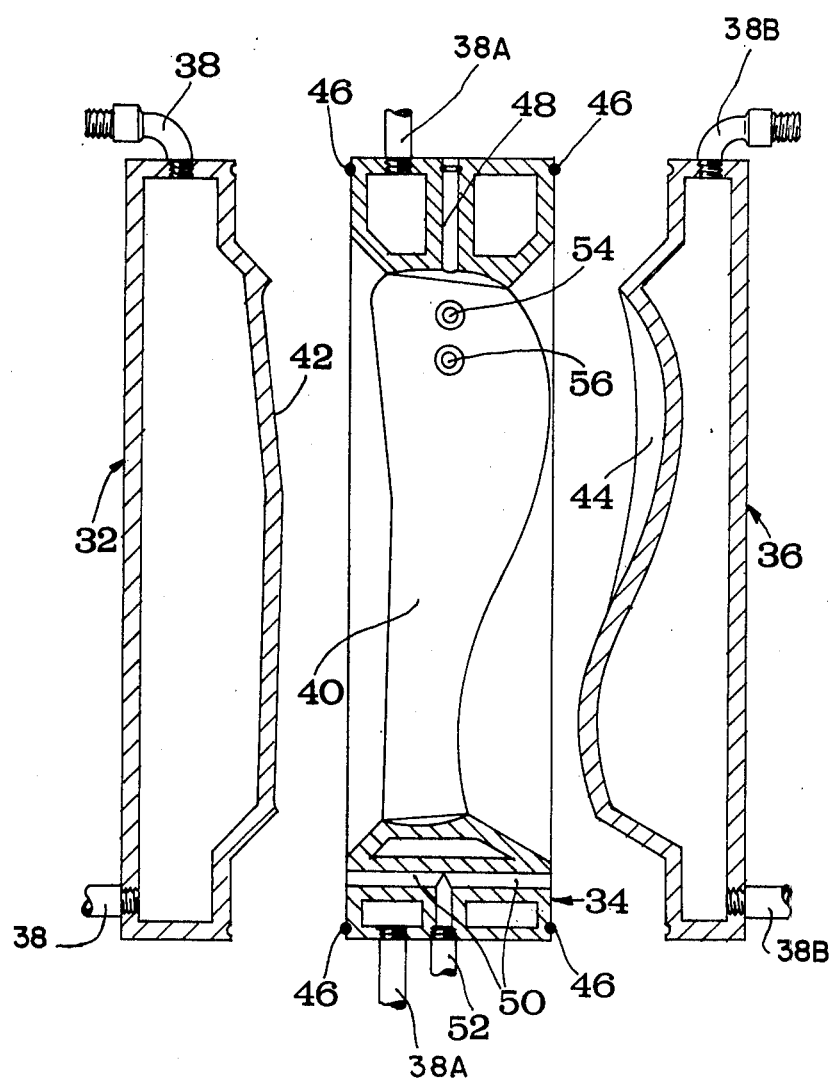
FIG. 4 is a schematic transverse section through a mold made of three parts and used for carrying out the process according to the invention.

A preferred embodiment of a mold for carrying out the process according to the invention will now be described with reference to FIG. 4. As shown in FIG. 4, this mold comprises three hollow parts 32, 34 and 36 each provided with a pipe fitting 38, 38A, 38B for the introduction and discharge of a heating fluid such as water to keep the mold in a manner known per se at the required temperature for polymerization of the polyurethane. The central part 34 of the mold is formed by a rectangular frame having an inner molding surface 40 of the same shape as the peripheral strip 10 of the seat back to be produced (FIGS. 1, 2, 3). The lateral mold parts 32 and 36 each have a molding surface 42 and 44, respectively, for molding the front sheet 12 and the rear sheet 14 of the seat back to be produced.

The three mold parts 32, 34 and 36 can be assembled and in the assembled condition the inner space defined thereby is hermetically sealed by gaskets 46. Means not shown in FIG. 4 are provided for holding the three mold parts in the assembled condition. The central mold part 34 has a hole 48 in its upper portion and through this hole the inner space of the mold communicates with the atmosphere. The hole 48 serves to receive the filler neck or sleeve 21 for filling the coating as will be described hereinafter.

The central mold part 34 further comprises ducts 50 leading from a connection pipe fitting 52 to the inner mold space sealed by the gaskets 46. Through the ducts 50 and pipe fitting 52 the inner mold space can be connected to a vacuum or lower pressure source (not shown) to reduce the pressure prevailing in the inner mold space. Finally, the central mold part 34 is provided with convex-headed pistons 54 and 56 movable into and out of the inner space of the mold for positioning the framework in the coating, as will be described hereinafter.

The process for producing a seat back as shown in FIGS. 1 to 3 with the mold shown in FIG. 4 will now be described:

With the coating 10, 12, 14 already sealed and turned inside out in the conventional manner and provided with the Renco Marwell seal and the filler neck 21, the framework 22 (FIG. 2) is inserted into the coating, the coating is closed and the coating together with the framework is placed in the open central mold part, as shown in FIG. 4, and the filler neck 21 is inserted into the hole 48 of the mold. The framework must be provided with locating holes or recesses 28, 30 in positions corresponding to those of the convexheaded pistons 54, 56 to ensure correct positioning of the framework (and thus the coating) for obtaining a seat back of the desired shape. Then the pistons 54 and 56 are actuated and partially move into the holes or recesses 28, 30 of the framework by deforming the surface of the coating material. This is shown in FIG. 5.

Then the coating is slightly pressurized inwardly through the filler neck 21 extending from the hole 48 in the central mold part 34 to bring every portion of the peripheral strip of the coating into tight engagement with the side surface 40 of the central mold part 34. Then the lateral mold parts 32 and 36 are moved into position against the central mold part and the mold is closed whereby the air contained in the coating is elastically compressed and, if required, some of the pressure is let off from inside the coating.

Then reduced pressure is applied to the connection pipe fitting 52 to keep the outer surface of the coating tightly adhering everywhere to the inner surface of the mold. After this polyurethane foam is injected into the mold, the polyurethane foam is allowed to polymerize and the mold is opened. After the pistons have been withdrawn, the finished seat back can be extracted from the central mold part. Then the filler sleeve 21 is cut off and the coating is pierced adjacent the holes 28 in the inner plates 26 of the framework, these holes being easily recognizable because they have already left a mark on the coating.

The seat back thus formed has a correct finish and good appearance on all sides when it is mounted on the seat supporting structure in a motor vehicle as the mark left by the removal of the filler neck and the seal 18 are concealed by the seat back supporting structure and by the fact that they are located adjacent the bottom cushion of the seat.

Preferred polyurethane foam compositions suitable for injection into the coating are, for example, the system 3963-3062 produced and distributed by Bayer or the system 3232 produced and distributed by Union Carbide, although numerous similar systems and other compositions can be used for producing the polyurethane foam.

The step of slight pressurization or inflation of the coating before closing the mold as well as the use of reduced pressure in the mold can be avoided by using instead, or in addition, positioning means such as pins 60 (see FIG. 6) projecting in desired positions from the peripheral strip of the seat back and insertable into corresponding recesses 62 provided in the inner surface 40 of the central mold part 34. As shown in FIG. 6, these pins 60 can preferably be arranged on the top side of the peripheral strip adjacent metal sleeves 64 which are normally incorporated in the framework for receiving headrests (not shown).

The process may also be used with coatings thermoformed previously or the process may be modified by carrying out the thermoforming operation in the same mold before the injection step. Instead of keeping the mold heated at 50°-60° C., as normally required for cold polymerization of polyurethane foam, in this case the mold is heated to a thermoforming temperature of, for example 150° C., before injection of the foam and before the foaming step and then the temperature of the mold is reduced to the normal foaming temperature.

If desired, the framework of the seat back may be enclosed and sealed under vacuum in a bag of flexible material such as PVC or polyethylene before its insertion in the coating. In this case the framework will be embedded in the padding when the seat back is finished, but it can be easily recovered if the seat back has to be discarded because of constructional defects, by merely tearing up the padding which, although enclosing the framework, does not adhere to the material of the bag.

Figure 7:
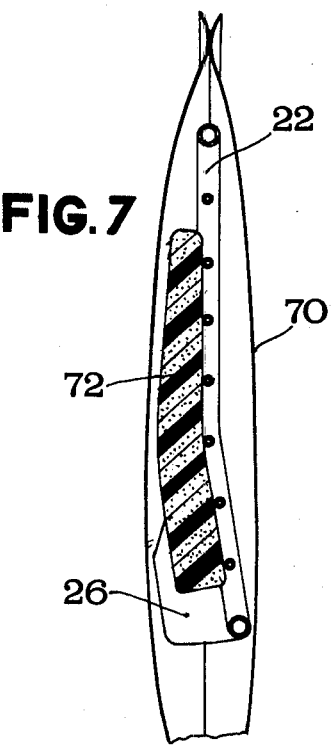
FIG. 7 is a sectional view of a framework inserted into a bag according to a modification of the process according to the invention.

As shown in FIG. 7, also a body 72 of resilient foamed plastic may be enclosed in the bag 70 of PVC or polyethylene together with the framework. When the body 72 is subsequently closed under vacuum in the bag 70, it will be squeezed together by the atmospheric pressure acting on its outside and its open cells will almost completely collapse. After carrying out the steps of the process as described above and after extracting the seat back or cushion from the mold, the coating of the seat back or cushion is pierced up to the inner bag 70 containing the framework and the compressed foam body and the bag itself is pierced to allow atmospheric air to penetrate thereinto. As the pressure inside the bag 70 thus becomes balanced with the pressure outside it, the foam body 72 will expand again due to its inherent resiliency which will gradually overcome the compressive force exerted by the surrounding padding. In this manner the spring characteristics of the seat back or cushion are enhanced and by appropriately selecting the shape and dimensions of the plastic foam body enclosed in the inner bag 70, seat backs and cushions of any desired spring characteristics can be obtained.

The inner bag 70 may be pierced by inserting a needle into the padding through the filler hole 20 of the coating toward the bag 70 or the bag may be pierced by making a hole in any desired place of the coating where the presence of a hole would be acceptable. However, preferably the inner bag 70 may be pierced by the same tool used for piercing the coating 10 to provide access to the holes 28 in the inner plates 26 of the framework (FIG. 5).

Although in the preferred embodiment of the process according to the invention the Renco Marwell seal is preferably used, this seal may also be omitted where it is desired to speed up the process. In this case the slit in the peripheral strip of the coating may be closed, for example, by heat sealing the two sheets together or connecting them by some other similar method. This may be particularly advisable where a perfect finish is required also in the area of the coating where the slit for insertion of the framework is located.

Depending on the particular shape of the seat back to be produced and on varying operation conditions, the process may also be modified by using positioning tabs spaced along one or both junction lines between the peripheral strip and the front and back sheets of the coating. These positioning tabs are then connected to corresponding positioning members located on the mold and are removed when the seat back is finished. This method of positioning can be adopted instead of or in addition to the pre-inflation method described above, or the method of positioning by means of pins, also described above, if one of these methods should prove to be inacceptable or insufficient in certain operating conditions or for particular shapes of seat backs to be produced.

Figure 8:
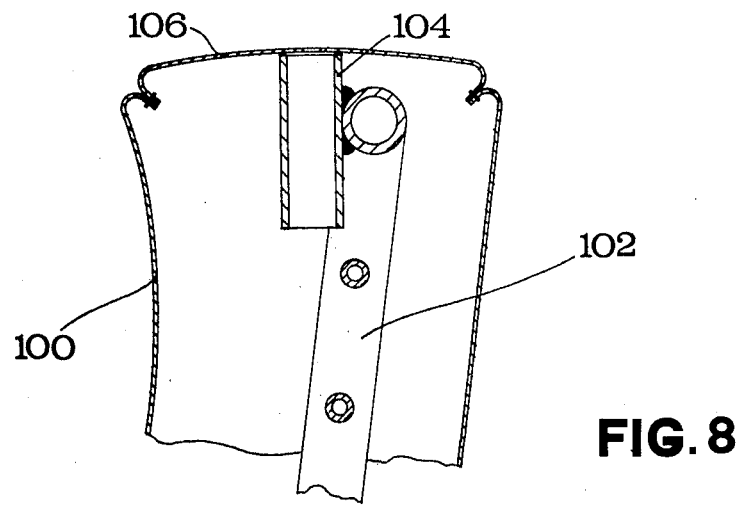
FIG. 8 is a part sectional view of a seat back coating and framework as used in the process according to the invention.

A particularly advantageous method of positioning which avoids the use of positioning pins and also avoids the introduction of polyurethane foam into the adjacent headrests receiving metal sleeves 64 (FIG. 6) will now be described with reference to FIGS. 8 to 10. In FIG. 8 the coating is indicated by 100 and contains a metal framework 102 provided with headrest receiving sleeves 104. The sleeve 104 extends substantially perpendicularly to an upper portion 106 of the coating and terminates slightly therebelow so that, when the seat back is finished, the sleeve 104 can be used as a headrest supporting rod after the coating has been cut through at the mouth of the sleeve 104.

Figure 9:
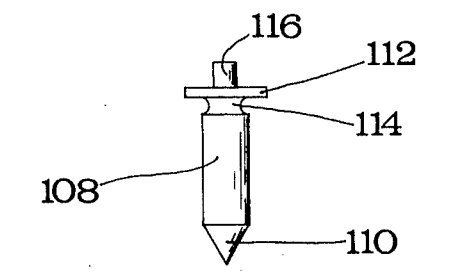
FIG. 9 is a side view of positioning means used in the seat back of FIG. 8.
Figure 10:
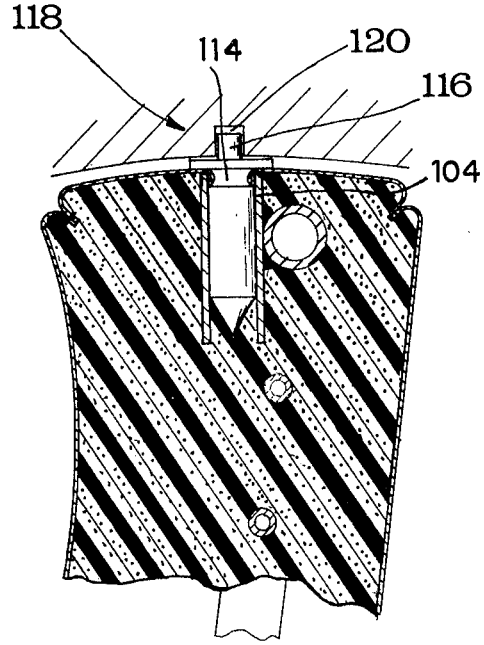
FIG. 10 is a view similar to FIG. 8, showing the seat back after being filled with foamed plastic material.

For cutting through the mouth of the sleeve 104 a punch as shown in FIG. 9 is preferably used. This punch has a cylindrical shank portion 108 whose diameter substantially corresponds to the inside diameter of the sleeve 104, a conical point 110, an annular rearward flange 112, an annular neck portion 114 of reduced diameter between the rearward flange 112 and the cylindrical portion 108, and a rearward positioning pin 116.

After having positioned the framework in the coating 100, the latter is pierced with a punch as shown in FIG. 9 adjacent the sleeve 104. The punch is pushed into the sleeve until the flange 112 engages the material of the coating, as shown in FIG. 10. In this position the cylindrical shank portion 108 of the punch substantially fills the inner space of the sleeve 104 while the edges of the opening made in the coating fill the space left by the neck portion 114, thus providing a substantially tight seal toward the outside of the coating. Thus the material of the coating surrounding the opening made by the punch serves as a sealing gasket.

The mold 118 in which the subsequent steps of the process are then carried out, is provided with reference recesses 120 for receiving the positioning pins 116 of the punches of which a plurality is used to correctly position the coating and framework relative to the mold. Then the following steps of the process may be carried out as described above, with slight internal pressurization of the coating, removing the pressure from the inside of the mold around the coating and injection of plastic foam into the coating to obtain the seat back. The pressure seal formed by the edges of the coating around the annular neck portion 114 has proved to be sufficient for foaming requirements.

After the seat back has thus been formed and the plastic foam has polymerized, the seat back is extracted from the mold and the punches are removed from their seats. The openings left by the punches are closed by conventional plug as is known in the art. When the seat back is to be provided with a headrest, it will then be sufficient to remove the plugs and insert the headrest supporting rods into the guide sleeves 104 which are left substantially free of plastic foam.

A preferred embodiment of an injection mold for carrying out the process according to the invention will now be described with reference to FIG. 11. Indicated by 32', 34' and 36' in FIG. 11 are the three parts of the mold corresponding to the mold shown in FIG. 4. The polyurethane foam injection hole is shown in dash lines and indicated by 48 whereas the other parts of the mold shown in FIG. 4 have been omitted for greater clarity.

The central mold part 34' is rigidly mounted on a base 130 from which a pair of uprights 132, 134 extends upwardly. A pair of horizontal guide bars 136, 138 extends between the uprights 132 and 134 and slidably supports the lateral mold parts 32', 36'. A double-acting hydraulic or pneumatic ram 140 is operatively mounted between the upright 132 and the lateral mold part 32' and a similar hydraulic or pneumatic ram 142 is operatively mounted between the lateral mold part 36' and the upright 134. By operating the rams 140 and 142 the mold can be opened and closed. An injection head 144 with injection nozzle 146 is schematically shown above the filler opening 48 in the central mold part 34'.

The seat back or cushion produced by the process and/or mold as described above is obviously hermetically sealed after it is finished, except for the presence of the filler hole 20. The filler hole may be closed by a plug after removal of the filler neck 21 to obtain a completely sealed cushion coating. However, to ensure satisfactory operation of the cushion or seat back there should be at least one air inlet and outlet opening in the coating to permit the polyurethane foam padding to perform its resilient springing function. For this reason the filler hole 20 is preferably left open to permit the passage of air therethrough and the cushion or seat back in use is so placed that the filler hole is not exhibited.

For this purpose, to obtain the best performance of the produced cushion or seat back, it is contemplated according to the invention to accurately dimension the filler hole either before or after injection of the plastic foam into the coating to provide an air passage opening whose damping effect on the elastic compression and expansion of the plastic foam padding is such as to optimize the degree of comfort for the occupant of the seat provided with the cushion or seat back according to the invention.

When considering that the padding of the cushion or seat back essentially behaves like a spring, even if its spring action is due to inherent resiliency, the elastic damping effect produced by the restriction of the filler hole to the free passage of air constitutes an additional factor governing the behaviour of the cushion or seat back and it is possible to select the optimum of this factor according to criteria well known in the art of oscillating systems. The damping constant can in fact be selected as desired by varying the diameter of the filler hole and/or making, if necessary, additional holes of known diameter after injection of plastic foam into the coating.

This can only be done with the cushion or seat back according to the invention because the coating thereof is hermetically sealed whereas in the known cushions or seat backs there is no means of knowing or controlling the size and distribution of the air passage openings or holes in the coating.

According to the invention it is also possible to completely close the filler hole 20 and to make instead appropriate openings in the coating for the passage of air during the elastic movements of the cushion or seat back. A preferred method of achieving this is to provide a plurality of small holes in the coating on the cushion or seat back surface which in use comes into contact with the body of the occupant of the seat. Obviously such holes will be made after injection of the plastic foam into the coating and after polymerization of the plastic foam. The provision of such holes, the number and overall area of which will preferably be calculated according to the criteria set out above, affords the additional advantage that the seat surface in engagement with the seat occupant is slightly aerated, thus making the seat more healthy in use and eliminating at least in part the need of using interlaced or apertured seat covers or rugs as are frequently used on motor vehicle seats during the summer season.

Although a process for the production of padded seat backs and a preferred embodiment of a mold for making such seat backs have thus been described in every detail, it is to be understood that numerous changes and modifications may be made both in the mold and process without thereby departing from the scope of the invention as defined by the appended claims.

I claim:

1. A process for producing the padded back portion of a motor vehicle seat having a framework with positioning means incorporated therein, comprising the steps of forming a covering of fluid-tight material having a slit extending over a length at least as great as the smallest width of the framework and a hole provided with a filler nozzle, inserting the framework through said slit into the covering, sealing the slit, placing the covering into a mold having the desired shape of the padded part to be produced, closing the mold, injecting polyurethane foam through the filler nozzle into the covering until the latter is completely filled, permitting the polyurethane foam to polymerize so that said framework is completely embedded in said polyurethane foam, and extracting the padded back part from the mold.

2. A process as claimed in claim 1, wherein pressure is reduced within the mold before injection of the polyurethane foam.

3. A process as claimed in claim 1, wherein said slit is sealed by a rapid sealing device previously applied to the slit.

4. A process as claimed in claim 1, wherein said framework is sealed under vacuum in a bag of flexible impermeable material before it is inserted into the covering through said slit.

5. A process as claimed in claim 4, wherein a body of resilient foamed plastic is sealed under vacuum in said bag of flexible impermeable material together with said framework and after extraction of the padded part from the mold said bag is pierced through the surrounding padding material to permit atmospheric air to enter the bag.

6. A process as claimed in claim 1, wherein said covering is provided with a plurality of positioning means which, after the covering is placed into the mold, are secured to the latter and after extraction of the padded back part from the mold, said positioning means are removed.

7. A process as claimed in claim 1, wherein said framework has positioning recesses on surfaces thereof which in the finished padded seat part engage the covering and before closing the mold, said positioning recesses serve to receive through said covering positioning heads supported by pistons movably mounted in the mold.

8. A process as claimed in claim 7, wherein said framework has a pair of lateral plates located adjacent the coating in the finished padded part and each plate is provided with a mounting hole and after extraction of the finished padded part from the mold said covering is pierced adjacent said mounting holes in said lateral plates for anchoring thereto support means for the produced padded part.

9. A process as claimed in claim 8, wherein said lateral plates coincide at least in part with said surfaces of the framework, which in the finished padded part engage the covering and said mounting holes coincide at least in part with said positioning recesses.

10. A process as claimed in claim 1, wherein said coating is slightly pressurized inwardly through said filler nozzle before closing the mold and then the mold is closed against the action of said internal pressure.

11. A process as claimed in claim 1, wherein said framework is provided with cylindrical sleeves for receiving headrest supporting rods and, before placing said covering into the mold, the covering is pierced adjacent the mouths of said cylindrical sleeves by cylindrical punches having a conical point and a cylindrical shank portion fitting exactly into said cylindrical sleeves, each punch being provided with a rearwardly extending pin projecting from the covering and engaging a corresponding recess in the mold.

12. A process as claimed in claim 11, wherein each of said cylindrical punches has an annular rearward flange located between said pin and said cylindrical shank portion and arranged to engage said covering and an annular neck portion is provided between said annular rearward flange and said cylindrical shank portion.

13. A padded back portion of a motor vehicle seat produced by the process of claim 1.

14. A mold for producing the padded back portion of a motor vehicle seat, comprising a central mold having recesses corresponding to positioning means on the framework and a pair of lateral mold parts with the central mold part rigidly mounted on a base and the lateral mold parts slidably mounted on guide bars supported by said base, said lateral mold parts being arranged to be opened and closed by ram means firmly connected to said base.

15. A mold as claimed in claim 14, wherein each of said ram means comprises a double-acting ram.

* * * * *